United States Patent [19]
Sugiyama et al.

[11] 4,360,165
[45] Nov. 23, 1982

[54] ROTARY TYPE ELECTROSTATIC SPRAY PAINTING DEVICE

[75] Inventors: Matsuyoshi Sugiyama, Susono; Teru Morishita, Shizuoka; Toshikazu Suzuki, Toyota, all of Japan

[73] Assignee: Toyota Jidosha Kogyo Kabushiki Kaisha, Toyota, Japan

[21] Appl. No.: 199,686

[22] Filed: Oct. 22, 1980

[30] Foreign Application Priority Data

May 23, 1980 [JP] Japan .................................. 55/67913

[51] Int. Cl.$^3$ ........................ B05B 5/04; F16C 7/04; F16C 17/10
[52] U.S. Cl. .................................. 239/703; 239/223; 308/9; 308/DIG. 1
[58] Field of Search .................................. 239/700–703, 239/214, 223, 224; 308/9, 15, 121, 122, 146, 168, 170, 174, DIG. 1

[56] References Cited

U.S. PATENT DOCUMENTS

| 2,449,297 | 9/1948 | Hoffer | 308/9 |
| 3,985,405 | 10/1976 | Okano et al. | 308/DIG. 1 X |
| 4,007,974 | 2/1977 | Huber | 308/DIG. 1 X |

FOREIGN PATENT DOCUMENTS 2336181  7/1977 France .................................. 239/703
1213959 11/1970 United Kingdom .................. 308/9

Primary Examiner—Andres Kashnikow
Attorney, Agent, or Firm—Kenyon & Kenyon

[57] ABSTRACT

A rotary type electrostatic spray painting device comprising a rotary shaft and a spray head fixed onto the front end of the rotary shaft. Paint is fed onto the cup shaped inner wall of the spray head. The rotary shaft is supported by a single thrust air bearing and a pair of radial air bearings. The thrust air bearing comprises a stationary annular plate and a pair of runners fixed onto the rotary shaft and arranged on each side of the annular plate. Each of the side walls of the annular plate comprises a central wall region facing the corresponding runner, and a peripheral wall region located radially outwardly from the runners. A plurality of air outflow bores is formed on the side walls of the annular plate in the central wall region for feeding air into the clearance between the annular plate and the runners. A plurality of pressure balancing bores are formed in the annular plate and arranged in the peripheral wall region. An electrode, continuously contacting the rear end of the rotary shaft, is provided. A negative high voltage is applied to the housing of the paint device. In addition, the negative high voltage is also applied to the spray head via the electrode and the rotary shaft.

13 Claims, 7 Drawing Figures

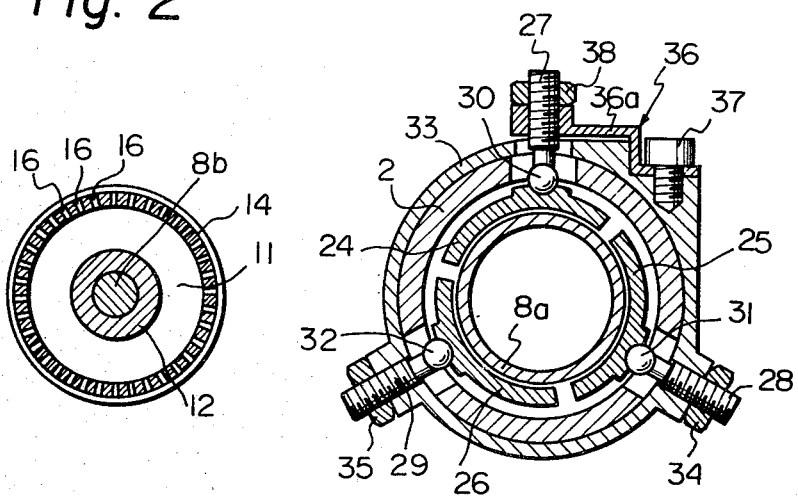

ROTARY TYPE ELECTROSTATIC SPRAY PAINTING DEVICE

DESCRIPTION OF THE INVENTION

The present invention relates to a rotary type electrostatic spray painting device.

As an electrostatic spray painting device used for painting, for example, bodies of motor cars, a rotary type electrostatic spray painting device has been known, which comprises a rotary shaft supported by ball bearings or roller bearings within the housing of the painting device, and a cup shaped spray head fixed onto the front end of the rotary shaft. In this painting device, a negative high voltage is applied to the spray head, and paint is fed onto the inner circumferential wall of the spray head. Thus, fine paint particles charged with electrons are sprayed from the spray head and are attracted by the electrical force onto the surface of the body of a motor car, which is grounded. As a result of this, the surface of the body of a motor car is painted. In such a rotary type electrostatic spray painting device, since the paint, the amount of which is about 90 percent relative to the amount of the paint sprayed from the spray head, can be efficiently used for painting the surface to be painted, the consumption of the paint is small and, as a result, a rotary type electrostatic spray painting device is used in various industries.

In order to form a beautiful finished surface when a surface is painted by using a spray paint, it is necessary to reduce the size of the particles of paint as much as possible. In the case wherein the paint is divided into fine particles by using the centrifugal force caused by the rotation of the spray head, as in a rotary type spray painting device, the strength of the centrifugal force, that is, the rotating speed of the spray head has a great influence on the size of the particles of paint. In other words, the higher the rotating speed of the spray head becomes, the smaller the size of the particles of paint becomes. Consequently, in order to form a beautiful finished surface by using a rotary type electrostatic spray painting device, it is necessary to increase the rotating speed of the spray head as much as possible. As mentioned above, in a conventional rotary type electrostatic spray painting device, ball bearings or roller bearings are used for supporting the rotary shaft of the electrostatic spray painting device and, in addition, a lubricant, such as grease, is confined within the ball bearings or the roller bearings. However, when such bearings, which are lubricated by grease, are rotated at a high speed, the bearings instantaneously deteriorate. Therefore, in a conventional rotary type electrostatic spray painting device adopting the bearings which are lubricated by grease, the maximum rotating speed of the rotary shaft, that is, the maximum rotating speed of the spray head, is at most 20,000 r.p.m. However, in the case wherein the rotating speed of the spray head is about 20,000 r.p.m., the size of the particles of paint is relatively large and, thus, it is difficult to form a beautiful finished surface by using such a conventional rotary type electrostatic spray painting device. In the field of manufacturing motor cars, the painting process for bodies of motor cars comprises a primary spraying step, an undercoating step, and a finish painting step. However, since it is difficult to form a beautiful finished surface by using a conventional rotary type electrostatic spray painting device as mentioned above, such a conventional rotary type electrostatic spray painting device is used for carrying out the undercoating step, but cannot be used for carrying out the finish painting step.

As a method of lubricating bearings, a jet lubricating system has been known, in which, by injecting the lubricating oil of a low viscosity into the region between the inner race and the outer race of the ball or roller bearing, the friction between the ball or roller and such races is greatly reduced and, at the same time, the heat caused by the friction is absorbed by the lubricating oil. In the case wherein the above-mentioned jet lubricating system is applied to a rotary type electrostatic spray painting device, it is possible to increase the rotating speed of the rotary shaft of the electrostatic spray painting device as compared with the case wherein grease lubricating bearings are used. However, since the jet lubricating system requires a complicated lubricating oil feed device having a large size, it is particularly difficult to apply such a jet lubricating system to a rotary type electrostatic spray painting device. In addition, if the lubricating oil is mixed with the paint, the external appearance of the paint surface is damaged. Therefore, if the jet lubricating system is applied to a rotary type electrostatic spray painting device, it is necessary to completely prevent the lubricating oil from leaking into the paint. However, it is practically impossible to completely prevent the lubricating oil from leaking into the paint and, thus, it is inadvisable to apply the jet lubricating system to a rotary type electrostatic spray painting device.

In addition, as a painting device capable of reducing the size of the particles of paint to a great extent, an air injection type electrostatic spray painting device has been known, in which the paint is divided into fine particles by the stream of injection air. In this air injection type electrostatic spray painting device, since the size of the particles of sprayed paint can be reduced to a great extent, as mentioned above, it is possible to form a beautiful finished surface. Consequently, in a field of manufacturing motor cars, the air injection type electrostatic spray painting device is adopted for carrying out the finish painting step for the bodies of motor cars. However, in such an air injection type electrostatic spray painting device, since the sprayed paint impinges upon the injection air and, then, a large amount of the sprayed paint escapes, together with the stream of the injection air, without adhering to the surface to be painted, the amount of the paint used to effectively paint the surface to be painted is about 40 percent of the amount of the paint sprayed from the electrostatic spray painting device. Consequently, in the case wherein an air injection type electrostatic spray painting device is adopted, there is a problem in that the consumption of the paint is inevitably increased. In addition, in this case, a problem occurs in that the paint escaping, together with the stream of the injection air, causes air pollution within factories.

An object of the present invention is to provide a rotary type electrostatic spray painting device capable of reducing the size of the particles of paint to be sprayed and reducing the quantity of paint used.

According to the present invention, there is provided a rotary type electrostatic spray painting device comprising: a metallic housing; a metallic rotary shaft rotatably arranged in said housing and having a front end and a rear end; a cup shaped metallic spray head fixed onto the front end of said rotary shaft and having a cup shaped inner wall; feeding means for feeding a paint onto said cup shaped inner wall; drive means cooperating with said rotary shaft for rotating said rotary shaft; non-contact type radial bearing means arranged in said housing and cooperating with said rotary shaft for radially supporting said rotary shaft under a non-contacting state; air supply means producing air under pressure; a stationary annular plate fixed onto said housing and having opposed side walls, said annular plate having a plurality of air outflow bores which are formed on the opposite side walls of said annular plate and are connected to said air supply means; a pair of runners fixed onto said rotary shaft and arranged on each side of said annular plate, each of the side walls of said annular plate being slightly spaced from said corresponding runner and having a peripheral wall portion and a central wall portion which faces said corresponding runner and has said air outflow bores formed thereon, said annular plate having at least one pressure balancing bore which passes through said annular plate and is arranged in said peripheral wall portion located radially outwardly from said runners; a generator generating a negative high voltage and having an output connected to said housing, and; electrode means arranged in said housing and electrically connecting said output to said spray head.

The present invention may be more fully understood from the description of preferred embodiments of the invention set forth below, together with the accompanying drawings.

BRIEF DESCRIPTION OF THE DRAWINGS

In the drawings:

FIG. 2 is a cross-sectional view taken along the line II—II in FIG. 1;

FIG. 3 is a cross-sectional view taken along the line III—III in FIG. 1;

FIG. 4 is a cross-sectional view taken along the line IV—IV in FIG. 1;

DESCRIPTION OF PREFERRED EMBODIMENTS

Figure 1:
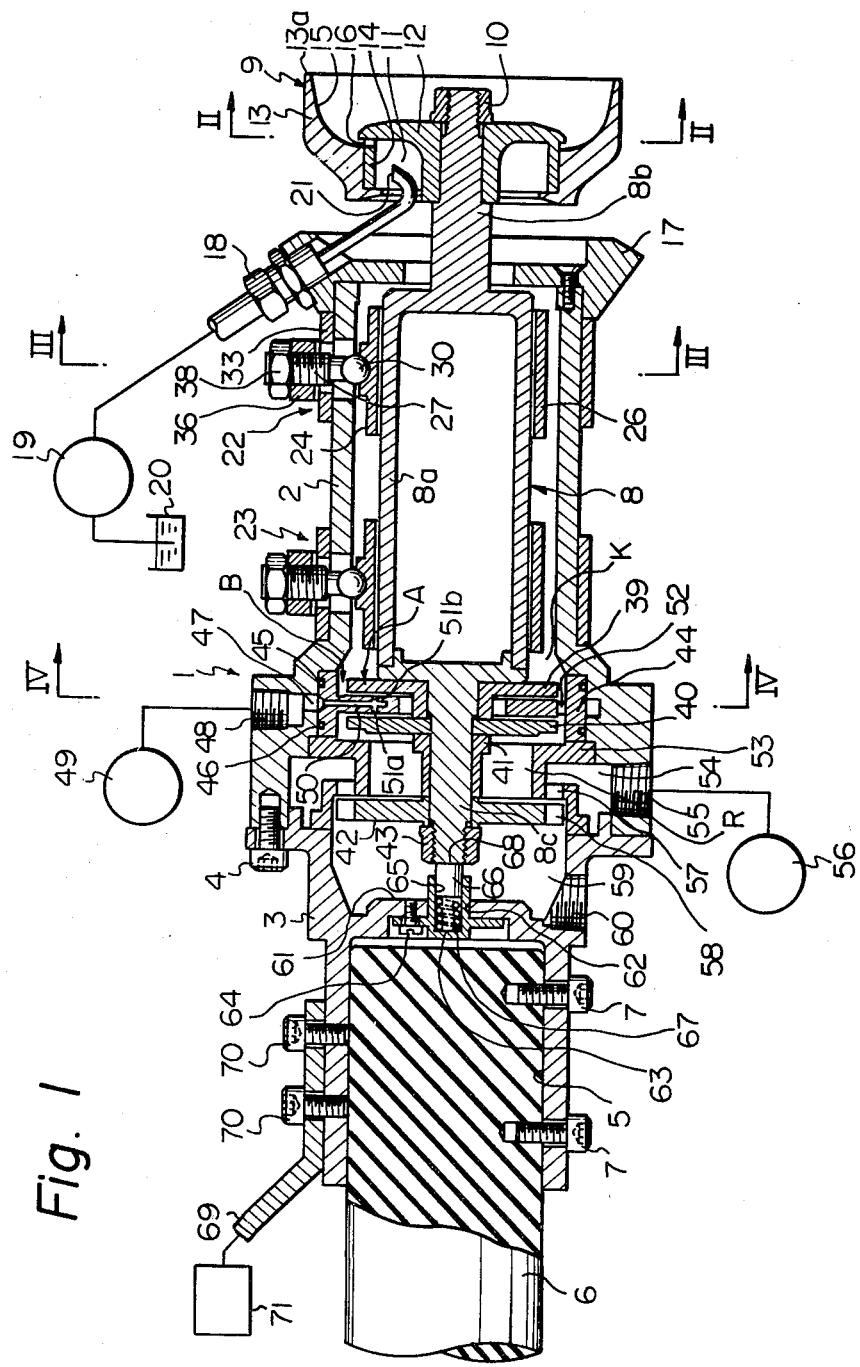
FIG. 1 is a cross-sectional side view of an embodiment of a rotary type electrostatic spray paint device according to the present invention.

Referring to FIG. 1, a rotary type electrostatic spray painting device, generally designated by reference numeral 1, comprises a generally hollow cylindrical front housing 2 made of metallic material, and a generally hollow cylindrical rear housing 3 made of metallic material. The front housing 2 and the rear housing 3 are firmly joined to each other by bolts 4. A support rod, made of electrically insulating material, 6 is fitted into a cylindrical hole 5 formed in the rear housing 3, and this rear housing 3 is fixed onto the support rod 6 by bolts 7. The support rod 6 is supported by a base (not shown). A rotary shaft 8 is inserted into the front housing 2. This rotary shaft 8 comprises a hollow cylindrical portion 8a located in the middle thereof, a shaft portion 8b formed in one piece on the front end of the hollow cylindrical portion 8a, and a shaft portion 8c fixed onto the rear end of the hollow cylindrical portion 8a. A spray head 9 made of metallic material is fixed onto the shaft portion 8b of the rotary shaft 8 by a nut 10. The spray head 9 comprises a spray head supporting member 12 forming therein an annular space 11, and a cup shaped spray head body 13 fixed onto the spray head supporting member 12. As illustrated in FIGS. 1 and 2, a plurality of paint outflow bores 16, each opening into the annular space 11 and smoothly connected to an inner wall 15 of the spray head body 13, is formed in an outer cylindrical portion 14 of the spray head supporting member 12. As illustrated in FIG. 1, an end plate 17 is fixed onto the front end of the front housing 2, and a paint injector 18 is mounted on the end plate 17. The paint injector 18 is connected to a paint reservoir 20 via a paint feed pump 19, and a nozzle 21 of the paint injector 18 is directed to the cylindrical inner wall of the outer cylindrical portion 14 of the spray head supporting member 12.

A pair of non-contact type tilting pad radial air bearings 22 and 23 is arranged in the front housing 2, and the rotary shaft 8 is rotatably supported on the front housing 2 via a pair of the tilting pad radial air bearings 22 and 23. Both the tilting pad radial air bearings 22 and 23 have the same construction and, therefore, the construction of only the tilting pad radial air bearing 22 will be hereinafter described. Referring to FIGS. 1 and 3, the tilting pad radial air bearing 22 comprises three pads 24, 25, 26 arranged to be spaced from the outer circumferential wall of the hollow cylindrical portion 8a of the rotary shaft 8 by an extremely small distance, and three support pins 27, 28, 29 supporting the pads 24, 25, 26, respectively. Spherical tips 30, 31, 32 are formed in one piece on the inner ends of the support pins 27, 28, 29, and are in engagement with spherical recesses formed on the rear faces of the pads 24, 25, 26, respectively. Consequently, the pads 24, 25, 26 can swing about the corresponding spherical tips 30, 31, 32, each functioning as a fulcrum. A bearing support frame 33 is fixed onto the outer circumferential wall of the front housing 2 by means of, for example, bolts (not shown), and the support pins 28, 29 are fixed onto the bearing support frame 33 by means of nuts 34, 35, respectively. In addition, one end of a support arm 36 having a resilient plate shaped portion 36a is fixed onto the bearing support frame 33 by means of a bolt 37, and the other end of the support arm 36 is fixed onto the support pin 27 by means of a nut 38. Consequently, the pad 24 is urged onto the hollow cylindrical portion 8a of the rotary shaft 8 due to the resilient force of the support arm 36.

Figure 5:
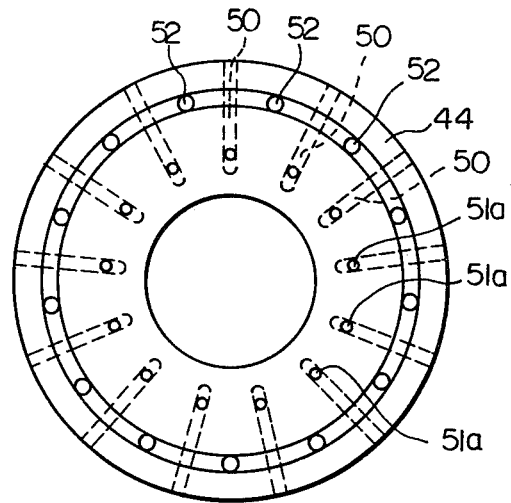
FIG. 5 is a front view of the annular plate illustrated in FIG. 1.

Turning to FIG. 1, a pair of disc shaped runners 39, 40 is inserted into the shaft portion 8c of the rotary shaft 8 and fixed onto the shaft portion 8c via a spacer 41 and a turbine wheel 42 by means of a nut 43. A stationary annular plate 44 is arranged between the runners 39 and 40, and the runners 39, 40 and the annular plate 44 construct a non-contact type thrust air bearing. As illustrated in FIG. 1, each of the runners 39, 40 is spaced from the annular plate 44 by a slight distance. Each of the side walls of the annular plate 44 comprises a central wall region A facing the runners 39, 40, and a peripheral wall region B located radially outwardly from the runners 39, 40. As illustrated in FIGS. 1 and 5, a plurality of pressure balancing bores 52, each interconnecting the peripheral wall regions B of the side walls of the annular plate 44 to each other is formed in the annular plate 44. The annular plate 44 is fixed onto the front housing 2 via a pair of O rings 45, 46. As illustrated in FIGS. 1 and 4, an annular groove 47, extending along the outer circumferential wall of the annylar plate 44, is formed on the inner wall of the front housing 2 and connected to an air feed pump 49 via a compressed air supply hole 48 which is formed in the front housing 2. A plurality of air passages 50, each extending radially inwardly from the annular groove 47, is formed in the annular plate 44. In addition, a plurality of air outflow bores 51a, each extending towards the runner 40 from the inner end portion of the corresponding air passage 50, is formed in the annular plate 44, and a plurality of air outflow bores 51b, each extending towards the runner 39 from the inner end portion of the corresponding air passage 50, is formed in the annular plate 44. From FIG. 1, it will be understood that the air outflow bores 51a and 51b are located in the central wall regions A of the side walls of the annular plate 44.

As illustrated in FIG. 1, a turbine nozzle holder 53 is fixed onto the front housing 2 at a position adjacent to the annular plate 44, and an annular air supply chamber 54 is formed between the turbine nozzle holder 53 and the front housing 2. The air supply chamber 54 is connected to a compressor 56 via a compressed air supply hole 55. The air supply chamber 54 comprises a compressed air injecting nozzle 57 having a plurality of guide vanes (not shown), and turbine blades 58 of the turbine wheel 42 are arranged to face the compressed air injecting nozzle 57. A housing interior chamber 59, in which the turbine wheel 42 is arranged, is connected to the atmosphere via a discharge hole 60 which is formed in the rear housing 3. The compressed air fed into the air supply chamber 54 from the compressor 56 is injected into the housing interior chamber 59 via the compressed air injecting nozzle 57. At this time, the compressed air injected from the injecting nozzle 57 provides the rotational force for the turbine wheel 42 and, thus, the rotary shaft 8 is rotated at a high speed. Then, the compressed air injected from the injecting nozzle 57 is discharged to the atmosphere via the discharge hole 60.

A through-hole 62 is formed on an end wall 61 of the rear housing 3, which defines the housing interior chamber 59, and an electrode holder 63 extending through the through hole 62 is fixed onto the end wall 61 by means of bolts 64. A cylindrical hole 65 is formed coaxially with the rotation axis of the rotary shaft 8 in the electrode holder 63, and a cylindrical electrode 66, made of wear resisting materials such as carbon, is inserted into the cylindrical hole 65 so as to be movable therein. In addition, a compression spring 67 is inserted between the electrode 66 and the electrode holder 63 so that the tip face 68 of the electrode 66 is urged onto the end face of the shaft portion 8c of the rotary shaft 8 due to the spring force of the compression spring 67. An external terminal 69 is fixed onto the outer wall of the rear housing 3 by means of bolts 70 and connected to a high voltage generator 71 used for generating a negative high voltage ranging from −60 kV to −90 kV. Consequently, the negative high voltage is applied to both the front housing 2 and the rear housing 3, and it is also applied to the spray head 9 via the electrode 66 and the rotary shaft 8.

In operation, paint is injected from the nozzle 21 of the paint injector 18 onto the circumferential inner wall of the outer cylindrical portion 14 of the spray head supporting member 12. Then, the paint, injected onto the circumferential inner wall of the outer cylindrical portion 14, flows out onto the inner wall 15 of the spray head body 13 via the paint outflow bores 16 due to the centrifugal force caused by the rotation of the spray head 9. After this, the paint spreads on the inner wall 15 of the spray head body 13 and flows on the inner wall 15 in the form of a thin film. Then, the paint reaches the tip 13a of the spray head body 13. As mentioned previously, a negative high voltage is applied to the spray head 9. Consequently, when the paint is sprayed from the tip 13a of the spray head body 13 in the form of fine particles, the particles of the sprayed paint are charged with electrons. Since the surface to be painted is normally grounded, the paint particles charged with electrons are attracted towards the surface to be painted due to electrical force and, thus, the surface to be painted is painted.

As mentioned previously, the rotary shaft 8 is supported by a pair of tilting pad radial air bearings 22, 23 and a single thrust air bearing which is constructed by the runners 39, 40 and the stationary annular plate 44. In the tilting pad radial air bearings 22, 23, when the rotary shaft 8 is rotated, ambient air is sucked into the extremely small clearances formed between the hollow cylindrical portion 8a and the pads 24, 25, 26. Then, the air thus sucked is compressed between the hollow cylindrical portion 8a and the pads 24, 25, 26 due to a so-called wedge effect of air, and therefore, the pressure of the air between the hollow cylindrical portion 8a and the pads 24, 25, 26 is increased. As a result of this, the force radially supporting the rotary shaft 8 is generated between the hollow cylindrical portion 8a and the pads 24, 25, 26. On the other hand, in the above-mentioned thrust air bearing, compressed air is fed into the air passages 50 from the air feed pumps 49 via the annular groove 47. Then, the compressed air is injected from the air outflow bores 51a into the clearance between the annular plate 44 and the runner 40, and also, injected from the air outflow bores 51b into the clearance between the annular plate 44 and the runner 39. As a result of this, the pressure, which is necessary to maintain the above-mentioned clearances formed on each side of the annular plate 44, is generated between the annular plate 44 and the runners 39, 40. Consequently, the rotary shaft 8 is supported by the thrust air bearing and a pair of the radial air bearings under a non-contacting state via a thin air layer. As is known to those skilled in the art, the coefficient of viscosity of air is about one thousandth of that of the viscosity of lubricating oil. Consequently, the frictional loss in the air bearing, which uses air as a lubricant, is extremely small. Therefore, since the amount of heat caused by the occurrence of the frictional loss is extremely small, it is possible to increase the rotating speed of the rotary shaft 8 to a great extent. In the embodiment illustrated in FIG. 1, it is possible to rotate the rotary shaft 8 at a high speed of about 80,000 r.p.m.

As mentioned above, in the thrust air bearing, the compressed air is injected from the air outflow bores 51a into the clearance between the annular plate 44 and the runner 40, and also, injected from the air outflow bores 51b into the clearance between the annular plate 44 and the runner 39. Then, the compressed air, injected into the clearance between the annular plate 44 and the runner 39, flows radially outwardly within the clearance and flows out into the space K between the front housing 2 and the hollow cylindrical portion 8a of the rotary shaft 8. In addition, the compressed air, injected into the clearance between the annular plate 44 and the runner 40, flows radially outwardly within the clearance and flows out into the space R enclosed by the runner 40, the turbine nozzle holder 53 and the turbine wheel 42. The supporting force of the thrust air bearing becomes stable when the pressure distribution in the clearance between the annular plate 44 and the runner 40 becomes equal to than in the clearance between the annular plate 44 and the runner 39. On the other hand, if the pressure in the outlet portion, at which the compressed air flows out from the clearance between the annular plate 44 and the runner 40, becomes equal to the pressure in the outlet portion at which the compressed air flows out from the clearance between the annular plate 44 and the runner 39, the pressure distribution in the clearance between the annular plate 44 and the runner 40 becomes equal to that in the clearance between the annular plate 44 and the runner 39. In the rotary type electrostatic spray painting device according to the present invention, since the pressure balancing bores 52 are formed in the annular plate 44, the pressure in the outlet portion, at which the compressed air flows out from the clearance between the annular plate 44 and the runner 40, is equal to that in the outlet portion at which the compressed air flows out from the clearance between the annular plate 44 and the runner 39. Therefore, in the present invention, a stable supporting force of the thrust air bearing can be obtained. If the pressure balancing bores 52 are not provided as in a prior art, a bore or a gap, through which the compressed air discharged into the space R escapes from the space R, is not present except for the gap between the air injection nozzle 57 of the turbine nozzle holder 53 and the turbine blade 58 of the turbine wheel 42. Therefore, since the pressure in the space R becomes higher than that in the space K, the performance of the thrust air bearing deteriorates. In addition, if the pressure in the space R becomes high, the compressed air within the space R flows out into the housing interior chamber 59 via the gap between the air injection nozzle 57 and the turbine blade 58. However, if the compressed air flows into the gap between the air injection nozzle 57 and the turbine blade 58, the air, injected from the air injection nozzle 57, is disturbed and, as a result, a problem occurs in that the efficiency of the turbine is reduced.

Figure 6:
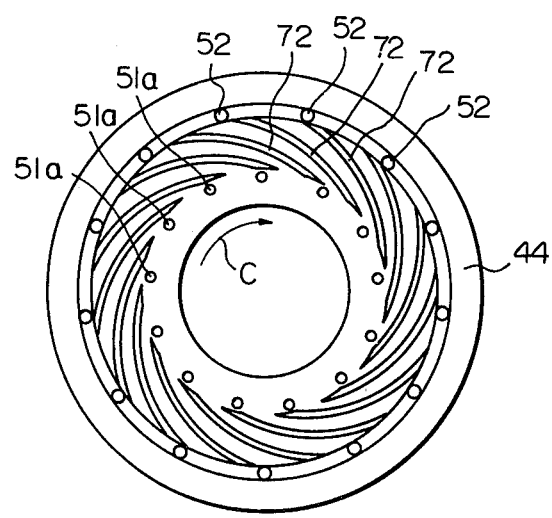
FIG. 6 is a front view of an alternative embodiment of the annular plate illustrated in FIG. 5.

FIG. 6 illustrates an alternative embodiment. In this embodiment, a plurality of spiral grooves 72 is formed on each side wall of annular plate 44 which is arranged between the runners 39, 40. As illustrated in FIG. 6, each of the spiral grooves 72 is so formed that it gradually approaches the central portion of the annular plate 44 as each of the spiral grooves 72 extends towards the rotational direction C of the rotary shaft 8. Consequently, the annular plate 44 and the runners 39, 40 construct a spiral grooved thrust air bearing. When the runners 39, 40 rotate, ambient air is sucked between the annular plate 44 and the runners 39, 40 via the spiral grooves 72 and, as a result, the runners 39, 40 are supported under a non-contacting state by the air thus sucked in and by the compressed air flowing out from the air outflow bores 51a, 51b.

Figure 7:
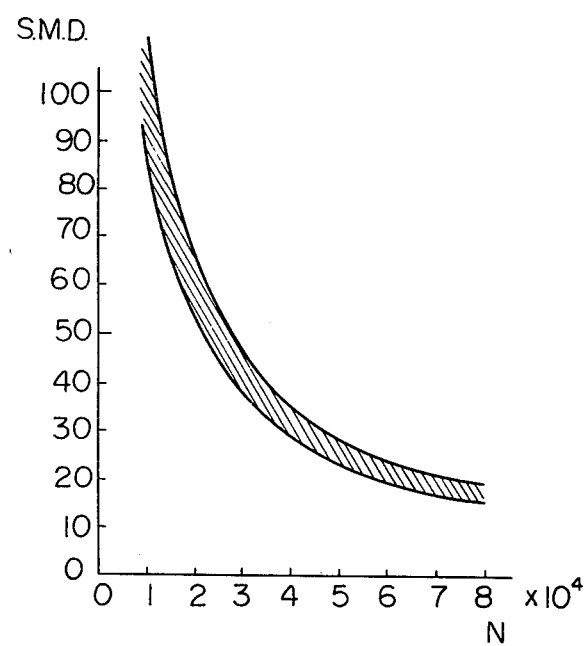
FIG. 7 is a graph showing the relationship between the size of paint particles and the rotating speed of the spray head.

FIG. 7 illustrates the relationship between the size of the particles of sprayed paint and the rotating speed of the spray head in the case wherein the spray head 9 (FIG. 1) having a diameter of 75 mm is used. In FIG. 7, the ordinate S.M.D. indicates the mean diameter ($\mu$m) of paint particles, which is indicated in the form of a Sauter mean diameter, and the abscissa N indicates the number of revolutions per minute (r.p.m.) of the spray head 9. As mentioned previously, in a conventional rotary type electrostatic spray painting device, the maximum number of revolutions per minute N of the spray head is about 20,000 r.p.m. Consequently, from FIG. 7, it will be understood that, if the spray head having a diameter of 75 mm is used in a conventional rotary type electrostatic spray painting device, the minimum mean diameter S.M.D. of paint particles is in the range of 55 $\mu$m to 65 $\mu$m. Contrary to this, in the present invention, the maximum number of revolutions per minute N is about 80,000 r.p.m. Consequently, from FIG. 7, it will be understood that the paint can be divided into fine particles to such a degree that the mean diameter S.M.D. of paint particles is in the range of 15 $\mu$m to 20 $\mu$m. Therefore, it will be understood that, in a rotary type electrostatic spray painting device according to the present invention, the size of paint particles can be greatly reduced, as compared with that of paint particles in a conventional rotary type spray painting device. In addition, as mentioned previously, the same negative high voltage is applied to the housings 2, 3 and the rotary shaft 8. Consequently, there is no danger that an electric discharge will occur between the housings 2, 3 and the rotary shaft 8.

According to the present invention, since the spray head can be rotated at a high speed of about 80,000 r.p.m., the size of the particles of sprayed paint can be reduced to a great extent. As a result of this, the size of paint particles becomes smaller than that of paint particles obtained by using a conventional air injection type electrostatic spray painting device. Consequently, in the present invention, it is possible to obtain an extremely beautiful finished surface and, therefore, a rotary type electrostatic spray painting device can be used for carrying out a finish painting step in the paint process, for example, for bodies of motor cars. In addition, in the present invention, since paint particles are created by rotating the spray head at a high speed, but are not created by air injection, the amount of the paint used to effectively paint the surface to be painted is about 90 percent of the amount of the paint sprayed from a rotary type electrostatic spray painting device. Consequently, since a large part of the sprayed paint is not dispersed within the factory, it is possible to prevent the problem of air pollution from arising. In addition, the amount of paint used can be reduced.

While the invention has been described by reference to specific embodiments chosen for purposes of illustration, it should be apparent that numerous modifications could be made thereto by those skilled in the art without departing from the basic concept and scope of the invention.

We claim:

1. A rotary type electrostatic spray painting device comprising:

a metallic housing;

a metallic rotary shaft rotatably arranged in said housing and having a front end and a rear end;

a cup shaped metallic spray head fixed onto the front end of said rotary shaft and having a cup shaped inner wall;

feeding means for feeding a paint onto said cup shaped inner wall;

drive means cooperating with said rotary shaft for rotating said rotary shaft;

non-contact type radial bearing means arranged in said housing and cooperating with said rotary shaft for radially supporting said rotary shaft under a non-contacting state;

air supply means producing air under pressure;

a stationary annular plate fixed onto said housing and having opposed side walls, said annular plate having a plurality of air outflow bores which are formed on the opposite side walls of said annular plate and are connected to said air supply means;

a pair of runners fixed onto said rotary shaft and arranged on each side of said annular plate, each of the side walls of said annular plate being slightly spaced from said corresponding runner and having a peripheral wall portion and a central wall portion which faces said corresponding runner and has said air outflow bores formed thereon, said annular plate having at least one pressure balancing bore which passes through said annular plate and is arranged in said peripheral wall portion located radially outwardly from said runners;

a generator generating a negative high voltage and having an output connected to said housing, and;

electrode means arranged in said housing and electrically connecting said output to said spray head.

2. A rotary type electrostatic spray painting device as claimed in claim 1, wherein said annular plate forms therein a plurality of radially extending air passages, each connecting said corresponding air outflow bore to said air supply means.

3. A rotary type electrostatic spray painting device as claimed in claim 1, wherein a plurality of spiral grooves is formed on the side walls of said annular plate.

4. A rotary type electrostatic spray painting device as claimed in claim 1, wherein said non-contact type radial bearing means comprises a pair of radial air bearings.

5. A rotary type electrostatic spray painting device as claimed in claim 4, wherein each of said radial air bearings comprises a bearing frame connected to said housing, a plurality of pads, each having an inner face which extends along a circumferential outer wall of said rotary shaft and is spaced from the circumferential outer wall of said rotary shaft by a slight distance, and a plurality of support pins, each being connected to said bearing frame and pivotally supporting said corresponding pad.

6. A rotary type electrostatic spray painting device as claimed in claim 5, wherein each of said radial air bearings further comprises a resilient arm through which one of said support pins is connected to said bearing frame for biasing said corresponding pad to the circumferential outer wall of said rotary shaft.

7. A rotary type electrostatic spray painting device as claimed in claim 5, wherein each of said pads has an outer wall forming a spherical recess thereon, each of said support pins having a spherical tip which is in engagement with the spherical recess of said corresponding pad.

8. A rotary type electrostatic spray painting device as claimed in claim 1, wherein said electrode means comprises an electrode which is arranged to continuously contact with the rear end of said rotary shaft.

9. A rotary type electrostatic spray painting device as claimed in claim 8, wherein said electrode is made of carbon.

10. A rotary type electrostatic spray painting device as claimed in claim 8, wherein the rear end of said rotary shaft has a flat end face extending perpendicular to the rotation axis of said rotary shaft, said electrode being arranged coaxially with the rotation axis of said rotary shaft and having a flat end face which is in contact with the flat end face of the rear end of said rotary shaft.

11. A rotary type electrostatic spray painting device as claimed in claim 8, wherein said electrode means further comprises an electrode holder fixed onto said housing and having therein a cylindrical hole, into which said electrode is slidably inserted, and a compression spring arranged in the cylindrical hole of said electrode holder between said electrode holder and said electrode.

12. A rotary type electrostatic spray painting device as claimed in claim 1, wherein said drive means comprises a compressor, an air injection nozzle arranged in said housing and connected to said compressor, and a turbine wheel fixed onto said rotary shaft and having a turbine blade which is arranged to face said air injection nozzle.

13. A rotary type electrostatic spray painting device as claimed in claim 1, wherein said cup shaped spray head comprises a cylindrical inner wall arranged coaxially with the rotation axis of said rotary shaft and defining therein an annular space, a plurality of paint outflow bores being formed in the cylindrical inner wall of said spray head and smoothly connected to the cup shaped inner wall of said spray head, said feed means having a paint injection nozzle which is arranged in said annular space.

* * * * *